Sept. 16, 1969   W. E. STANDLEY ET AL   3,466,834
METHOD AND APPARATUS FOR LOADING CASES
Filed Dec. 21, 1966   6 Sheets-Sheet 1

Inventors
Wendell E. Standley and
Richard B. Wittmann
By Gary, Parker,
Juettner & Cullinan
Att'ys.

Sept. 16, 1969 W. E. STANDLEY ET AL 3,466,834
METHOD AND APPARATUS FOR LOADING CASES
Filed Dec. 21, 1966 6 Sheets-Sheet 4

Inventors
Wendell E. Standley and
Richard B. Wittmann
By Gary, Parker,
Juettner & Cullinan Att'ys United States Patent Office 3,466,834
Patented Sept. 16, 1969

3,466,834
METHOD AND APPARATUS FOR LOADING CASES
Wendell E. Standley, Lake Forest, and Richard B. Wittmann, Chicago, Ill., assignors to Johns-Nigrelli-Johns, Inc., Skokie, Ill., a corporation of Illinois
Filed Dec. 21, 1966, Ser. No. 603,561
Int. Cl. B65b 35/40, 35/54, 5/08
U.S. Cl. 53—26                                    18 Claims

ABSTRACT OF THE DISCLOSURE

Method and apparatus for loading a plurality of packages into an open top case or tray by stopping a leading group of packages of a continuous package supply holding back the packages behind the leading group of packages, releasing the leading group of packages, and thereafter pushing the leading group of packages into the leading one of a continuous supply of trays or cases.

---

The present invention relates to a tray and case loader and to a method for loading packages into open top cases or trays, and the apparatus of the present invention is particularly well adapted for loading packages of bottles or cans commonly known as four-packs, six-packs and eight-packs, into a case or tray.

It is conventional in the packaging art, and particularly in the soft drink and brewing industry, to pack bottles or cans in groups of four, six or eight, and to transport such packs in cases or trays which commonly will accommodate twenty-four cans or bottles, i.e., six four-packs, four six-packs, or three eight-packs. It is known in the art to provide automatic machinery including an article conveyor and a tray conveyor for delivering trays one at a time to a loading station and for loading the trays seriatim with a plurality of groups of articles, e.g., for loading four six-packs into a single layer tray. A case or tray loader is shown in Nigrelli et al. U.S. Patent 3,141,274, issued July 21, 1964, and assigned to the assignee of the present invention. A case loader of the foregoing type is relatively complex and expensive, and operates at high speeds so as to be capable of loading sixty or more single layer cases per minute. However, there are many packaging operations where the expense of such a case loader is not fully justified and where the loading capacity thereof is substantially in excess of requirements.

It is therefore a principal object of the present invention to provide a simplified form of case loader which is unusually economical to manufacture and yet extremely reliable in operation.

Another object of the invention is to provide a case loader which is quite compact and which has a relatively small number of moving parts.

A further one of our objects is to provide an improved case loader in combination with an article conveyor and a case conveyor, the article conveyor being of a type which operates continuously to supply articles in abutted relation and which slips beneath the articles when the latter are stopped, and the case conveyor being of a type which operates continuously to supply cases in abutted relation and which slips beneath the cases when the latter are stopped.

The foregoing and other objects and advantages of the invention will be apparent from the following description thereof.

Now, in order to acquaint those skilled in the art with the manner of making and using our invention, we shall describe, in conjunction with the accompanying drawings, a preferred embodiment of the invention.

DETAILED DESCRIPTION OF THE INVENTION

Before describing our invention in detail, it should be understood that the term "case" is commonly used to designate an open top container having side and end closure flaps thereon, and the term "tray" to indicate an open top container without flaps. However, the apparatus of the present invention is adapted to load both cases and trays and thus such terms are used interchangeably herein and in the appended claims.

Figure 1:
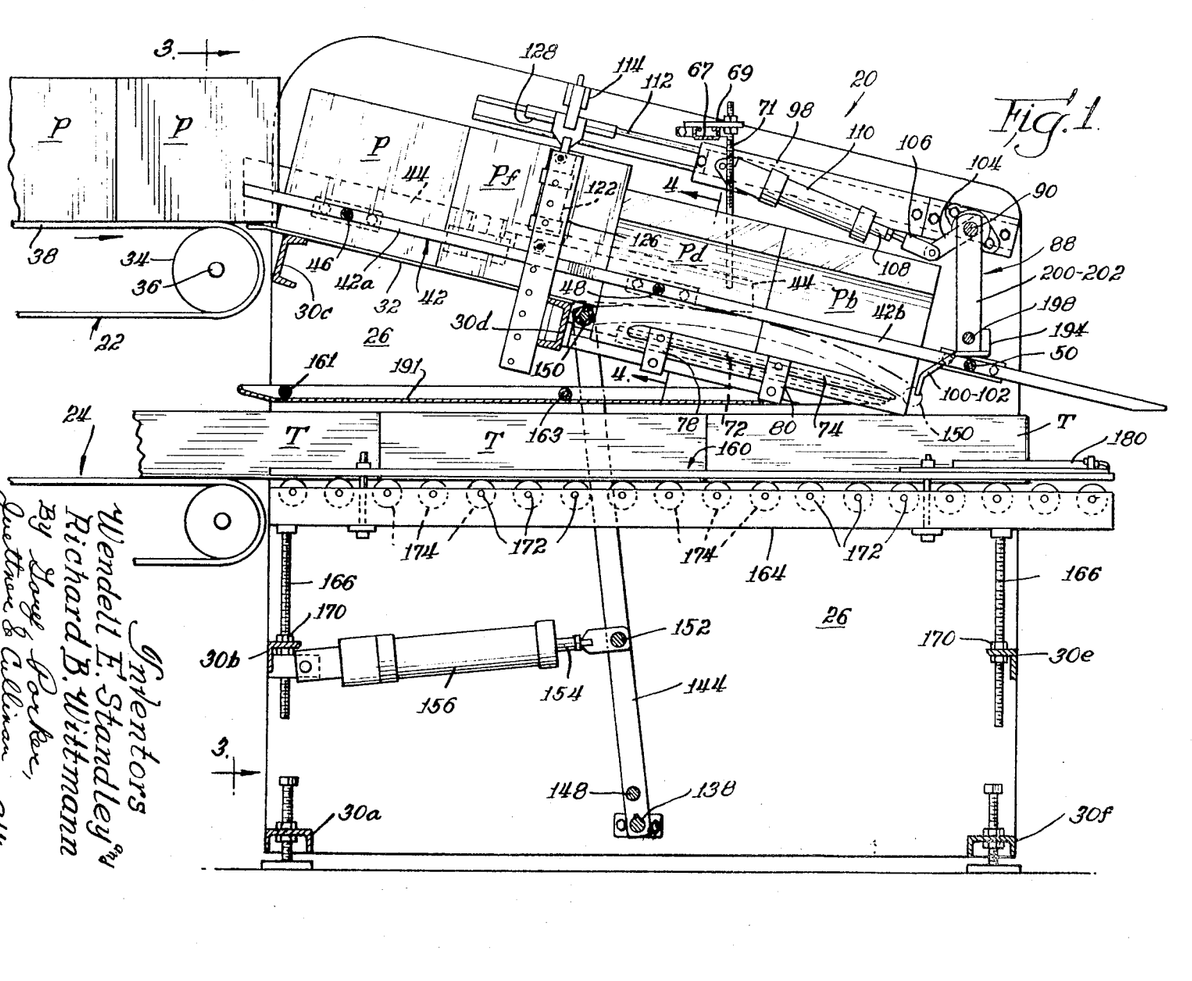
FIGURE 1 is a vertical sectional view, partly in elevation, taken substantially along the line 1—1 of FIGURE 2, showing a case loader constructed in accordance with the present invention, and showing in combination therewith a continuously operating article conveyor and a continuously operating case conveyor.
Figure 2:
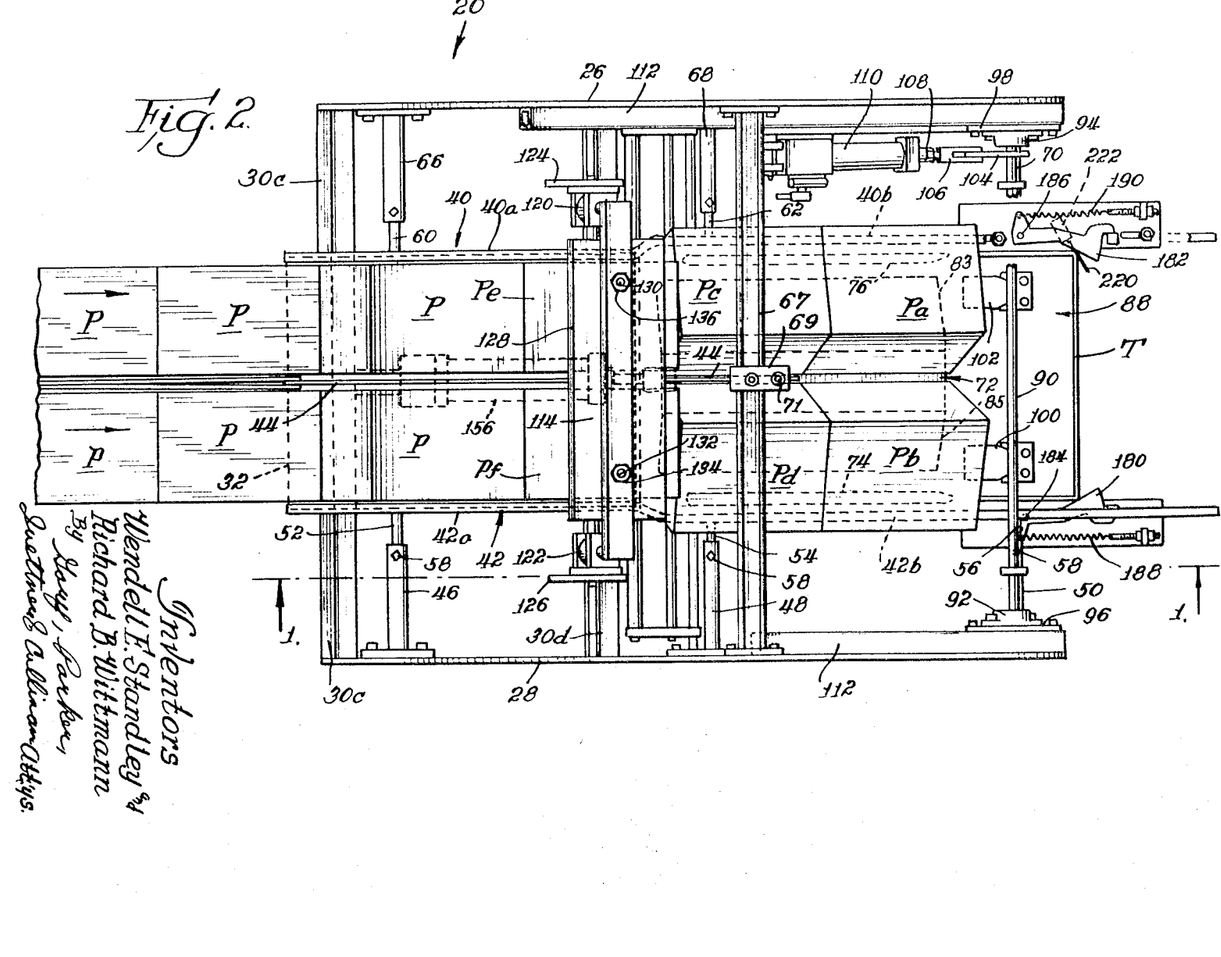
FIGURE 2 is a top plan view of the apparatus of FIGURE 1.
Figure 3:
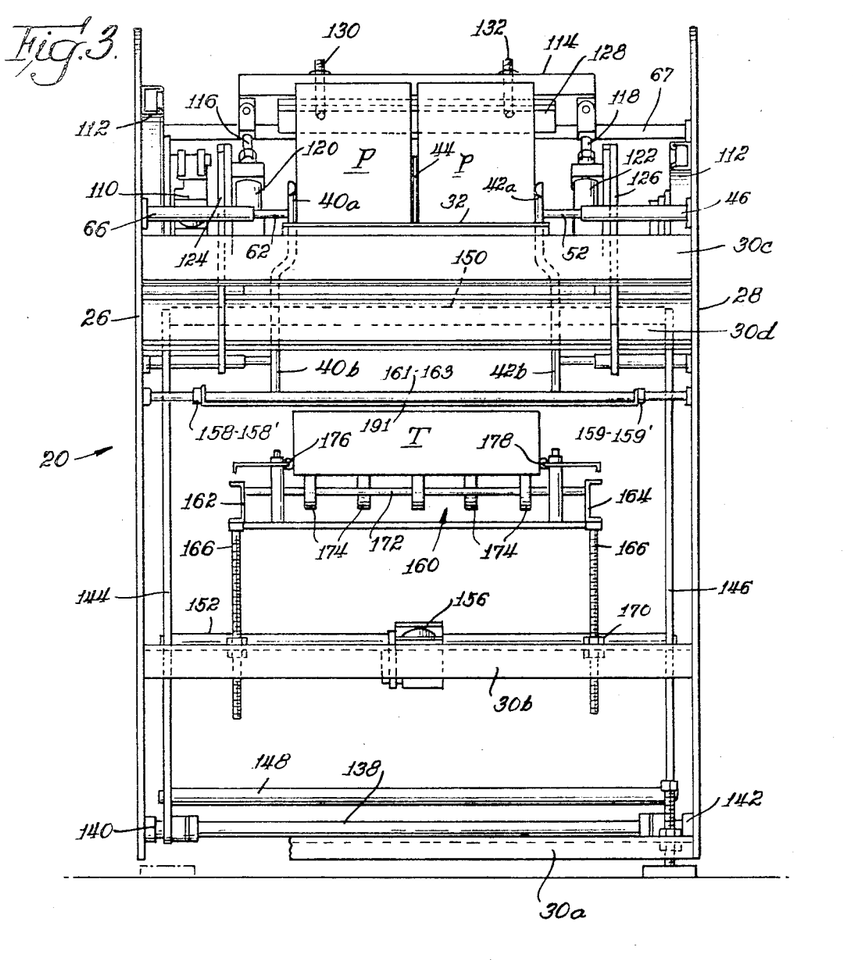
FIGURE 3 is an end elevational view looking approximately in the direction of the arrows 3—3 of FIGURE 1.

Referring now to the drawings, FIGURES 1–3 show a case loader 20 in combination with an article or package conveyor 22 and a case conveyor 24. The case loader 20 includes a pair of upright spaced apart side plate frame members 26 and 28 which are disposed in parallel relation and interconnected by a plurality of cross brace members such as shown at 30a, 30b, 30c, 30d, 30e and 30f in order to provide a rigid frame assembly. As best shown in FIGURE 1 the members 30c and 30d comprise a pair of transverse channels which extend between the side plates 26 and 28 and are welded or otherwise secured thereto. A downwardly inclined stationary infeed plate 32 is supported on the transverse channels 30c and 30d so that the upper rear end of the infeed plate is disposed adjacent the end of the article conveyor 22. The article conveyor 22 includes a pulley 34 which rotates in a clockwise direction on a shaft 36 and has an endless belt 38 trained thereover. Thus, articles P delivered by the conveyor 22 will be delivered to the top of the infeed plate 32 and will slide downwardly on the latter.

It will be assumed for purposes of the present description that the case loader 20 is being used for loading six-packs of cans or bottles into a tray, and that the trays are single-layer trays designed to hold four six-packs, i.e. twenty-four cans or bottles. Accordingly, six-packs such as indicated at P are delivered by the article conveyor 22 in two side-by-side rows, and the six-packs are supplied continuously so that each package as it arrives at the case loader 20 is in substantially abutting relation with a like package forwardly thereof and another rearwardly thereof. The conveyor 22 preferably operates continuously and is designed to slip beneath the articles or packages thereon when such articles are stopped due to the stopping of articles forwardly thereof, as will be described more fully hereinafter. In the particular embodiment being described herein the article conveyor 22 is approximately horizontal, and the infeed plate 32 is inclined downwardly from the horizontal at an angle of approximately 13 degrees. In this manner, the articles P will readily move down the infeed plate 32 due to gravity so that little if any additional load will be placed on the conveyor 22 in order to accomplish such movement.

As the two side-by-side rows of the articles or packages P move down the inclined infeed plate 32 they are guided by a pair of oppositely disposed side guide rails 40 and 42, and also by a center divider plate 44 which extends between the two package rows. As best shown in FIGURE 2, the side plate 28 carries three horizontally disposed tubular rail supports 46, 48 and 50, and the side rail 42 is provided with three corresponding studs 52, 54 and 56 which are slidably mounted in the rail supports and adjustably held therein by set screws 58. The oppositely disposed side guide rail 40 also has three studs 60, 62 and 64 thereon which are adjustably carried in tubular rail supports 66, 68 and 70, the supports being mounted from the side plate 26. It will be noted that the side guide rails 40 and 42 extend substantially the full length of the case loader 20. The guide rails include sections 40a and 42a which extend alongside the infeed plate 32 to guide articles thereon, and thereafter the rails are offset laterally outwardly to provide guide rail sections 40b and 42b which permit tilting of the articles P as will be described more fully hereinafter. FIGURES 1 and 2 show a cross beam 67 which extends between and is supported by the side plates 26 and 28, and a bracket 69 which is adjustably mounted on the beam 67. A rod 71 extends downwardly from the bracket 69 and is welded or otherwise affixed to the forward end of the center divider plate 44 so as to support the latter.

Figure 4:
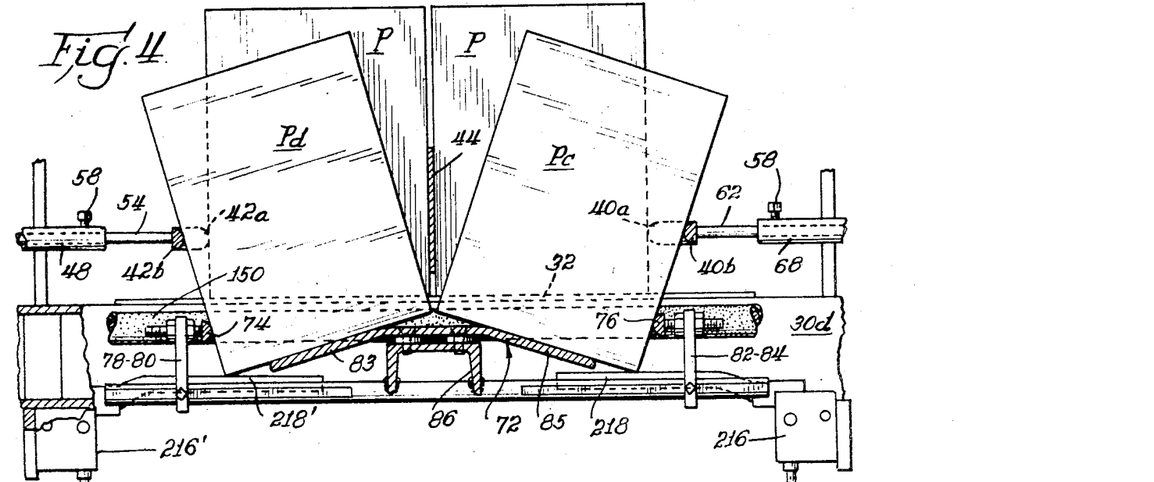
FIGURE 4 is an enlarged sectional view taken approximately along the line 4—4 of FIGURE 1.

When the articles or packages P pass beyond the lower end of the infeed plate 32 they are supported by the upper guide rail sections 40b and 42b and by a loading plate 72. As shown in FIGURE 1, the loading plate 72 is generally parallel to the infeed plate 32 but is offset downwardly therefrom. Referring to FIGURE 4, it will be seen that as two side-by-side packs P move off the end of the infeed plate 32 they will tilt away from one another due to the fact that the guide rails sections 40b and 42b are offset outwardly, and because the loading plate 72 is not of sufficient width to maintain the packs upright. In order to assist in controlling the position of the tilted packages, an additional pair of lower guide rails 74 and 76 is provided.

As shown in FIGURES 1 and 4 the bottom rail 74 has a pair of studs which are slidably mounted in apertures provided in a pair of rail supports 78 and 80, and the opposite bottom guide rail is adjustably supported in a similar manner by a pair of rail supports 82 and 84. As also shown in FIGURES 1 and 4, the loading plate 72 comprises a generally flat plate with inclined side portions 83 and 85 which is supported on a channel member 86 and is approximately parallel to the infeed plate 32. Thus, in the particular embodiment being described, the loading plate 72 is inclined at an angle of about 13 degrees to the horizontal. It will be seen from FIGURE 4 that the lower guide rails 74 and 76 are positioned laterally inwardly of the upper guide rails 40b and 42b in order to account for the inclination of the packages P, and each tilted package P is thus supported simultaneously by one of the side portions 83 and 85 of the loading plate 72 and by one of the upper side rails and one of the lower side rails.

A front package stop assembly, indicated generally at 88 in FIGURES 1 and 2, is provided in order to temporarily stop the packages P which are disposed at the lower end of the loading plate 72. A cross bar 90 has its opposite ends supported in bearings 92 and 94 which are mounted on slide members 96 and 98, the latter members being adjustably movable along respective slide rail members 112 carried by the side plates 26 and 28. In the embodiment being described, the cross bar 90 has a pair of depending stop arms 100 and 102 mounted therefrom and located so as to be in alignment with the two side-by-side rows of packages P, and the number of individual stop arms may be increased or decreased in accordance with the number of side-by-side rows of packages being accommodated by the case loader 20.

A crank arm 104 has one end fixedly mounted on the cross bar 90 and its other end pivotally connected to an adapter 106 at the end of a piston rod 108. The piston rod 108 is slidable in an air cylinder 110 and is actuated thereby, the air cylinder being pivotally supported at its rear end on the slide member 98. The stop assembly 88 is shown in its operative position in FIGURE 1 so that the stop arms 100 and 102 engage the front of the two leading packages P and prevent forward movement thereof. It will be understood however that when the air cylinder 110 is actuated so as to extend the piston rod 108, the latter will rotate the shaft 90 and stop assembly 88 in a counterclockwise direction as viewed in FIGURE 1 so as to raise the stop arms 100 and 102 to an inoperative position thereby permitting forward movement of the two side-by-side rows of packages P. It is also important to note that the entire stop assembly 88 including the air cylinder 110 is carried on the two slides 96 and 98, and each of the latter is adjustable along a corresponding rail such as shown at 112 in FIGURE 1. Consequently, the entire front stop assembly may be adjusted forwardly or rearwardly depending upon the dimensions of the packages being loaded.

In accordance with the preferred embodiment being described, a plurality of packages P comprising the entire contents for a tray T are disposed on the loading plate 72, and as will be described more fully hereinafter the trailing packages P disposed on the infeed plate 32 are temporarily held on the latter while the packages P on the loading plate 72 are delivered to a waiting tray at a loading station. In the particular example being described the packages P comprise six-packs arranged in two side-by-side rows, and the trays are single layer trays which hold four six-packs. Accordingly, as shown in FIGURE 2, there are four six-packs Pa, Pb, Pc and Pd disposed in tilted position on the loading plate 72, and during a loading operation the foregoing four packages will be advanced into a waiting tray T, while the following two packages PE and Pf will be restrained.

Referring again to FIGURES 1–3, a clamp support member 114 is disposed transversely to the direction of package feed and is positioned above the forward portion of the infeed plate 32. The two ends of the support member 114 are mounted on a pair of piston rods 116 and 118 (see FIGURE 3) associated with respective air cylinders 120 and 122. The air cylinders 120 and 122 are mounted from upright support plates 124 and 126 and can be adjusted generally vertically along the length of the latter to vary the distance between the clamp support member 114 and the infeed plate 32 in accordance with the height of the packages P being loaded. FIGURE 1 illustrates the manner in which the upright plates 124 and 126 are mounted from the transverse channel member 30d. A clamp plate 128 is suspended from the support member 114 so as to overlie the leading packages disposed on the infeed plate 32, i.e. the packages Pe and Pf in the embodiment being described.

The clamp plate 128 is provided with a pair of threaded studs 130 and 132 which extend up through the support member 114 and are secured by a pair of nuts or the like 134 and 136 (see FIGURE 2). It will be seen from FIGURE 1 that the clamp plate 128 is inclined so as to be substantially parallel to the infeed plate 32 in order to be adapted for clamping down on the top of the leading packages on the infeed plate. It will further be understood from the foregoing that upon actuation of the air cylinders 120 and 122 to retract the piston rods 116 and 118, the clamp plate 128 will be moved generally downwardly toward the infeed plate 32 so as to clamp down on the tops of the packages disposed on the leading portion of the infeed plate, i.e. the packages P*e* and P*f*, thereby preventing forward movement of such packages and any packages therebehind.

When the clamp plate 128 is operative to restrain the packages disposed on the infeed plate 32, the packages disposed on the loading plate 72 are advanced to a tray T waiting at a loading station. The feed mechanism for advancing such packages will now be described with reference to FIGURES 1–3. A shaft 138 extends transversely between the two side plates 26 and 28 proximate the lower end thereof, the ends of the shaft being mounted in bearings 140 and 142 (see FIGURE 3) which are carried by the side plates. A pair of lever arms 144 and 146 each has its lower end secured to the shaft 138, one arm being connected adjacent each end of the shaft so as to be pivotally movable about the axis thereof. The arms 144 and 146 are interconnected adjacent their lower ends by a tie rod 148, and a push rod 150 is carried by the upper ends of the arms, each end of the push rod 150 being secured to the upper free end of a corresponding one of the arms 144 and 146. As best shown in FIGURE 1, a further cross bar or tie rod 152 extends between the two lever arms 144 and 146 intermediate the ends thereof, and a piston rod 154 is connected to the cross bar 152 and is slidable within an air cylinder 156, the latter being mounted from the transverse angle bar 30*b* which extends between the side plates 26 and 28.

FIGURE 1 illustrates the manner in which the push rod 150 functions to advance a plurality of packages P from the loading plate 72 into loading relation with a tray T which is waiting therebeneath at a loading station. It will be seen that the loading plate 72 is offset beneath the infeed plate 32 while being substantially parallel to the latter. In addition, the infeed plate 32 terminates a short distance before the loading plate 72 begins, and in its normal position the push rod 150 is disposed in the resultant space immediately above the loading plate 72 and slightly behind the rear end thereof. Accordingly, in the example being described in which four six-packs are disposed on the loading plate 72, the two six-packs P*c* and P*d* disposed on the rear portion of the loading plate will be offset downwardly from the packages on the infeed plate 32, in addition to being tilted, and the push bar 150 will be disposed substantially immediately behind the lower portions of the rear ends of the packages P*c* and P*d*.

Thus, upon actuation of the air cylinder 156 to extend the piston rod 154, the push bar 150 will be swung through an arc about the axis of the shaft 138 until it reaches the limiting position shown in dash lines in FIGURE 1, thereby pushing the four packages P*a*, P*b*, P*c* and P*d* into a waiting tray T, as will be described more fully hereinafter. It will be noted that due to the offset arrangement of the loading plate 72, the lower portions of the packages P*c* and P*d* are exposed to the push bar 150 even though prior to operation of the push bar such packages will normally be in abutting relation with the next pair of packages P*e* and P*f* on the infeed plate 32. Depending upon the size of the packages P, it is desirable to adjust the location of the front package stop assembly 88 forwardly or rearwardly as necessary to locate the rear end of the package group on the loading plate 72 substantially immediately in front of the pusher bar 150. In this manner the pusher bar 150 will engage the packages to be loaded before it gains substantial momentum and therefore will not damage the packages in any way.

The apparatus for supplying and positioning trays or cases T will now be described. The tray conveyor 24 continuously feeds a supply of trays T in end-to-end abutted relation to a tray conveyor section 160 of the case loader 20. The tray conveyor section 160 comprises a pair of longitudinal frame members 162 and 164 (see FIGURE 3) which are interconnected with one another and are supported on four threaded rods 166, one at each end of the two frame members. The rearwardly disposed rods 166 are threaded through the transverse angle bar 30*b* so as to be supported thereby, and the two forwardly disposed rods 166 are similarly threaded through the transverse angle bar 30*e* which extends between the side plates 26 and 28. The four threaded rods 166 support the assembly of the frame members 162 and 164 but are rotatable relative thereto, and by rotating the four rods 166 it is possible to adjust the height of the tray conveyor section 160. The rods 166 may be fixed in desired positions by rotating lock nuts 170 thereon into engagement with the corresponding angle bars 30*b* and 30*e*.

A plurality of transverse rods 172 extend between the two longitudinal frame members 162 and 164, the rods 172 being supported by the frame members and preferably being arranged in spaced, parallel, coplanar relation. Each of the several rods 172 serves to mount a plurality of anti-friction rollers 174 thereon, the rollers being spaced along the length of each rod and being freely rotatable thereon. While the term "conveyor" is used to describe the tray conveyor section 160, it will be understood that the rollers 174 are not driven and the propelling force for advancing the trays T is provided solely by the supply conveyor 24. FIGURE 3 shows a pair of side guide rails 176 and 178 which guide the trays as they move over the rollers 174.

The trays T advance in single file on the conveyor section 160 until the leading tray engages against a pair of spring-loaded stop arms 180 and 182, as best shown in FIGURE 2. The stop arms 180 and 182 are pivotally mounted on pins 184 and 186, and are biased to their operative positions as shown in FIGURE 2 by tension springs 188 and 190, respectively. The springs 188 and 190 are sufficiently strong so that when a tray T engages against the stops 180 and 182, the tray will be stopped and the continuously operating conveyor 24 will slip beneath the trays thereon. However, when a plurality of packages P are conveyed into engagement with the leading wall of a tray disposed in loading position against the stop arms 180 and 182, as will be described more fully hereinafter, the stop arms will be deflected out of the way so as to permit the tray to pass thereby.

It will be seen that in the present embodiment the tray conveyor section 160 is approximately horizontal, whereas as described earlier herein the loading plate 72 is inclined downwardly at an angle of approximately 13 degrees. The foregoing is a preferred arrangement, but the loading plate 72 and the tray conveyor section 160 may be oriented in various ways, the essential feature being that the loading plate and the tray conveyor section must converge toward one another. FIGURE 3 shows collars 158, 158′, 159 and 159′ which are adjustably mounted on a pair of cross bars 161 and 163 (see FIGURE 1) and support a thin flap hold down plate 191. When the containers or trays T comprise cases having top flaps thereon, the plate 191 will serve to hold such flaps open until after the packages P have entered the case.

Figure 7:
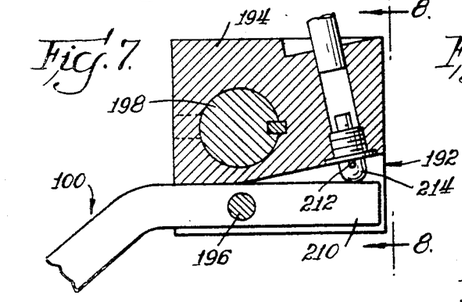
FIGURE 7 is a sectional view of an air control valve assembly which comprises one of the components of the control system of FIGURE 6.
Figure 8:
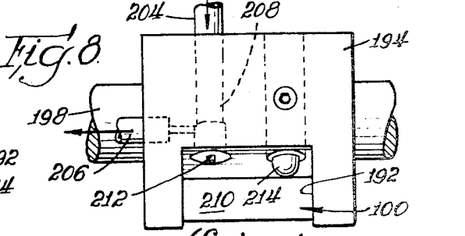
FIGURE 8 is an elevational view looking approximately in the direction of the arrows 8—8 of FIGURE 7.

It is desirable to include various sensing means in the control system for the case loader 20 so as to assure that the packages P and a tray T are in loading position before an operating cycle is initiated. The previously described front stop arms shown at 100 and 102 in FIGURES 1 and 2 may be associated with valve members in order to prevent initiation of an operating cycle until the proper number of packages are disposed on the forward portion of the loading plate 72. Thus, FIGURES 7 and 8 show the stop arm 100 disposed in recess 192 formed in a valve housing block 194, the arm being pivotally connected to the housing by a pivot pin 196. The block 194 is mounted on and keyed to a shaft 198 carried by the lower ends of a pair of arms 200 and 202 which depend from the cross bar 90 (see FIGURE 1). An air inlet is shown at 204 in FIGURE 8 and the air outlet at 206, both being formed in the valve block 194 and normally being closed by a valve 208.

The stop arm 100 has an end portion 210 which is engageable against a valve actuator 212 to open the valve 208 when the arm 100 is pivoted in a counterclockwise direction as viewed in FIGURE 7. The arm 100 is biased to its clockwise position by a spring-loaded pin 214 which is housed within the valve block 194 and engages the arm portion 210, but when a package P engages the stop arm 100 as previously described, the arm 100 will be pivoted in a counterclockwise direction so as to open the valve 208. In the embodiment described hereinabove the packages P are disposed in two side-by-side rows on the loading plate 72 so as to engage against corresponding stop arms 100 and 102, and thus the stop arm 102 is associated with a valve 208' similar to the valve 208.

Figure 6:
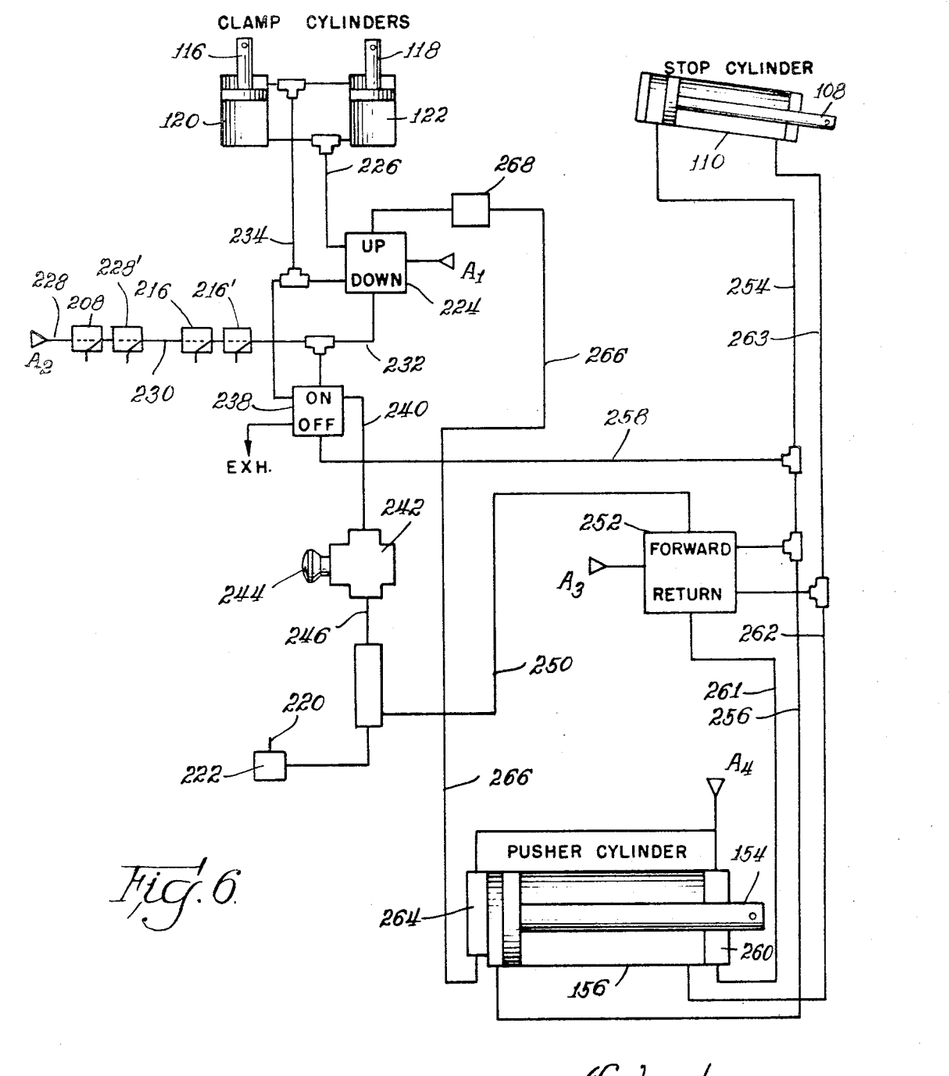
FIGURE 6 is a schematic air circuit diagram showing the air control system for the case loader of the present invention.

FIGURE 4 shows a valve assembly 216 in conjunction with a pivotal sensing arm 218, the latter being disposed beneath the package Pc on the loading plate 72 so as to be pivoted to a valve-opening position by the presence of the latter package. In a similar manner, a valve assembly 216' and a sensing arm 218' are located so that the sensing arm 218' will be actuated and will open the valve 216' when a package is disposed in the position of the package Pd. FIGURE 6 shows the valve 216 and 216' in series with the valves 208 and 208', as will be described more fully hereinafter. FIGURE 2 shows a wire feeler arm 220 associated with a valve 222 and disposed so that a tray T which is in a loading position against the stop arms 180 and 182 will deflect the feeler arm 220 and open the valve 222.

The air control circuit for the case loader 20 will now be described in conjunction with FIGURE 6. A source of air under pressure is indicated in several places as $A_1$, $A_2$, $A_3$ and $A_4$. Air under pressure from the air source $A_1$ is normally directed by a clamp valve 224 through a line 226 which leads to the lower ends of the clamp cylinders 120 and 122 so as to maintain the clamp plate 128 in its upper or inoperative position. The air source $A_2$ communicates with the valves 208 and 208' through a line 228, and it will be understood that the latter valves will be opened only when the packages Pa and Pb are in loading position in engagement with the stop arms 100 and 102. An air line 230 leads from the valve 208' to the valves 216 and 216', and as previously explained the latter two valves will be opened only when a second pair of packages Pc and Pd are in loading position on the rear portion of the loading plate 72 so as to engage the sensing arms 218 and 218'.

It will be understood from the foregoing that when the packages Pa, Pb, Pc and Pd are all present in proper position on the loading plate 72, the valves 208, 208', 216 and 216' will all be open so that air from the source $A_2$ will pass through an air line 232 to the clamp valve 224 and actuate the latter causing the air from the air source $A_1$ to be directed through an alternate line 234 leading to the upper ends of the clamp cylinders 120 and 122. In this manner, the clamp plate 128 will be moved downwardly to clamp the packages Pe and Pf on the forward end of the infeed plate 32 when a predetermined number of packages comprising the entire contents for a tray T are disposed in loading position on the loading plate 72.

When the clamp valve 224 is actuated so as to conduct air from the air source $A_1$ through the line 234, the air under pressure is also conducted through a line 236 to a pilot-operated valve 238 and then through a line 240 to a cycle start valve 242 including a knob 244. The valve 242 is opened by pulling the knob 244 and comprises a manually operable master control for completing a closed air circuit. The air from the source $A_1$ passes from the valve 242 through a line 246 to a normally closed booster valve 248. The valve 222 is associated with the booster valve 248, and when a tray or case is present in the loading position so as to deflect the feeler wire 220 and open the valve 222, the latter will admit air therethrough and will actuate the booster valve 248. Accordingly, the air under pressure will pass through a line 250 to a pilot-operated valve 252 causing the latter to shift to the forward position and allow the air under pressure from source $A_3$ to flow through lines 254 and 256 to stop cylinder 110 and pusher cylinder 156. In this manner, the stop assembly 88 of FIGURE 1 is raised, and the pusher cylinder piston rod 154 is extended to move the push bar 150 through its actuating stroke, thereby pushing the packages on the loading plate 72 into the waiting tray T.

The line 254 also supplies a line 258 which is connected to the pilot-operated valve 238 causing the latter to shift to the off position and thereby temporarily cutting off the air pressure supply to line 240. When the cylinder rod 154 extends to its fullest stroke, an inter-pilot valve 260 is depressed thereby allowing air pressure from source $A_4$ to flow in line 261 causing air pilot valve 252 to shift back to the return position. In this manner, air from source $A_3$ is caused to flow in lines 262 and 263 thus returning piston rod 154 of cylinder 156 and piston rod 108 of stop cylinder 110. When piston rod 154 is in its fullest retracted position, an inter-pilot 264 is depressed allowing air from source $A_4$ to flow in line 266 to an impulse relay 268 which conducts a momentary volume of air pressure to air pilot-operated valve 224 thereby causing the latter to shift to the up position. Consequently, air from source $A_1$ is caused to flow in line 226 raising the clamp plate 128 and thus completing one full cycle of operation.

Figure 9:
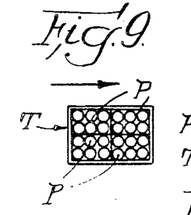
FIGURES 9, 10 and 11 are top plan views showing, respectively, a case loaded with four six-packs, a case loaded with three eight-packs and a case loaded with six four-packs.
Figures 10, 11:
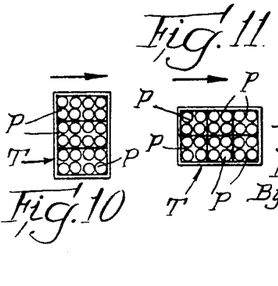
Figure 12:
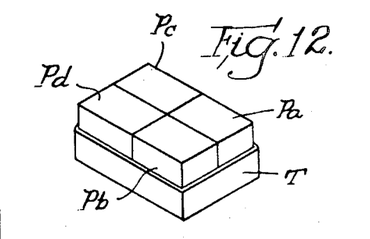
FIGURE 12 is a perspective view showing a case loaded with four six-packs.

The operation of the case loader 20 and related control system will now be briefly reviewed, and for this purpose reference is made to FIGURES 1–3 and also to the sequential schematic views of FIGURES 13–17. A plurality of articles or packages P are delivered to the case loader 20 from the article conveyor 22. The packages may be delivered in single file, although normally they will be delivered in two or more rows. Six-packs and four-packs are preferably supplied in two side-by-side rows, whereas eight-packs are preferably delivered in three side-by-side rows. FIGURE 9 illustrates an arrangement of four six-packs, FIGURE 10 illustrates an arrangement of three eight-packs, and FIGURE 11 illustrates an arrangement of six four-packs, and in each such arrangement there are provided twenty-four cans or bottles or the like comprising the complete contents for a single layer tray T. The packages P are supplied on the conveyor 22 in substantially continuous fashion and it is not necessary to arrange such packages in separate groups.

The articles or packages P delivered by the conveyor 22 are conducted to the top of the inclined infeed plate 32 and slide down the latter by gravity, although to the extent necessary each package will be pushed by the package therebehind due to the propelling force supplied by the conveyor 22. By way of illustration it will be assumed that the articles comprise six-packs which are supplied in two side-by-side rows as shown in FIGURES 1–3, and when a pair of side-by-side packages reach the lower end of the infeed plate 32 they drop off the end of the latter and fall to the loading plate 72 so as to assume a tilted position as best shown in FIGURE 4. The first two packages will move along the loading plate 72 until they engage the stops 100, 102, and a second pair of packages will follow the first pair and be disposed therebehind in tilted position on the loading plate 72. Further packages will be delievered to the infeed plate 32 so as in effect to fill the case loader 20, and the article conveyor 22 will then slip beneath the packages thereon as the stops 100, 102 prevent forward movement of such packages.

Figure 13:
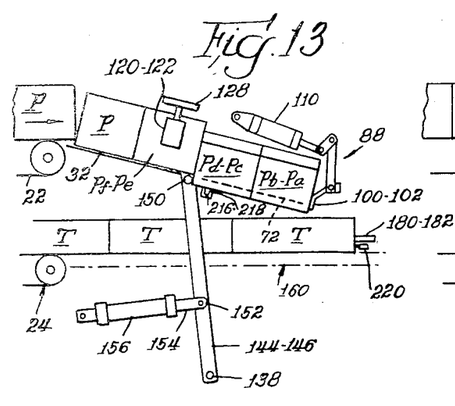
FIGURES 13 to 17 are schematic elevational views illustrating various sequential steps in the operation of the case loader.
Figure 14:
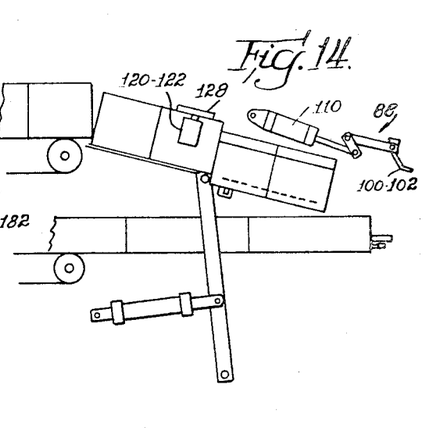

A plurality of trays T will be delivered by the tray conveyor 24 to the case loader conveyor section 160 and the trays will move in end-to-end abutted relation over the anti-friction rollers 174 until the leading tray abuts against the stop arms 180, 182, after which the conveyor 24 will slip beneath the trays thereon. As previously explained in conjunction with FIGURE 6, as soon as the four packages P*a*, P*b*, P*c*, and P*d* are all in loading position on the loading plate 72 as shown in FIGURE 13, the valves 208, 208', 216 and 216' will all be opened, thus causing the cylinders 120 and 122 to move the clamp plate 128 downwardly into engagement with the tops of the first two packages P*e* and P*f* on the infeed plate 32. Thereafter, assuming a tray T is in position against the stops 180, 182, the valve 222 will be opened and the cylinder 110 will be actuated to raise the stop members 100, 102 to an inoperative position as shown in FIGURE 14. As the stops 100 and 102 are being raised to release the packages on the loading plate 72, or substantially immediately thereafter, air is supplied to the cylinder 156 so as to move the pusher bar 150 through its arcuate path from the position shown in FIGURE 14 to the position shown in FIGURE 16. In this manner, the four packages P*a*, P*b*, P*c* and P*d* on the loading plate 72 are advanced while all of the remaining packages are held back by the clamp plate 128.

Figure 15:
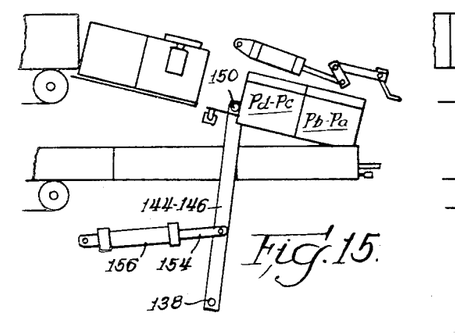
Figure 16:
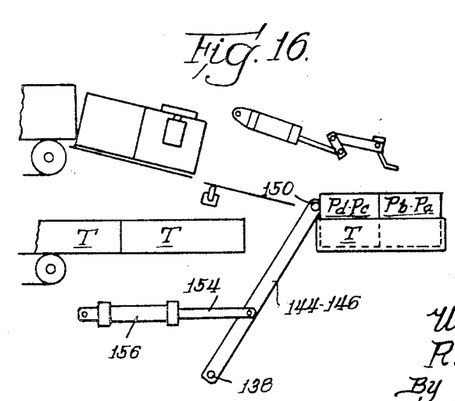

As the pusher bar 150 moves forward the packages on the loading plate 72 are moved off the end thereof, and the lower portions of the two leading packages P*a* and P*b* engage against the upper portion of the leading wall of a tray T in loading position (as shown in FIGURE 15) so as to advance the tray past the yieldable stops 180, 182. In this manner, the four packages P*a*, P*b*, P*c* and P*d* are loaded into the tray T and the loaded tray is advanced (see FIGURE 16) to a take-away conveyor or the like (not shown). It will be understood that due to the tilted position of the packages as they leave the loading plate 72 and enter the tray T, the packages fit readily into the tray without any possibility for interference with the side walls of the latter. Apparatus for effecting such tilting of the packages before delivering the same to a tray or case is described and claimed in the previously-mentioned Nigrelli et al. U.S. Patent 3,141,274.

Figure 17:
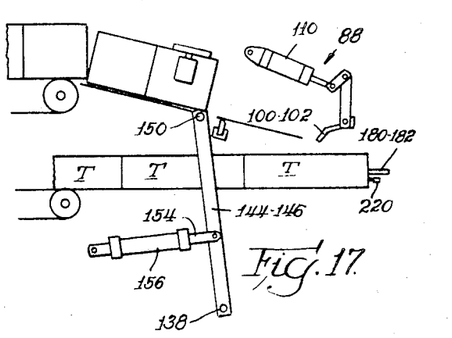

After the pusher bar 150 has completed its forward stroke, the operation of the cylinder 156 is automatically reversed so as to return the pusher bar to its original position as shown in FIGURE 17. As the pusher bar 150 is being returned to its original position, air is also supplied to the cylinder 110 to return the stop members 100, 102 to their lower operative positions, and upon return of the pusher bar, air is also supplied to the cylinders 120, 122 so as to raise the clamp plate 128 to its inoperative position. Upon raising of the clamp plate 128, four more packages are free to slide downwardly from the infeed plate 32 into a loading position on the loading plate 72 with the two leading packages engaged against the stop arms 100, 102, and in the embodiment described four more packages from the conveyor 22 will be delivered to the infeed plate 32, after which the conveyor 22 will again slip beneath the packages thereon.

It should also be noted that during a loading operation as a tray T in loading position is engaged by packages delivered from the loading plate 72 as shown in FIGURE 15 and propelled forwardly thereby, the remaining trays will be advanced by the conveyor 24 until a further tray is moved into loading position in engagement with the stops 180, 182. It will be understood however that the forward movement of the pusher bar 150 is at a greater rate of speed than the tray conveyor 24, so that a loaded tray will be moved past the stops 180, 182 and the latter will be returned to their normal operative positions before the next tray arrives at the loading station.

Figure 5:
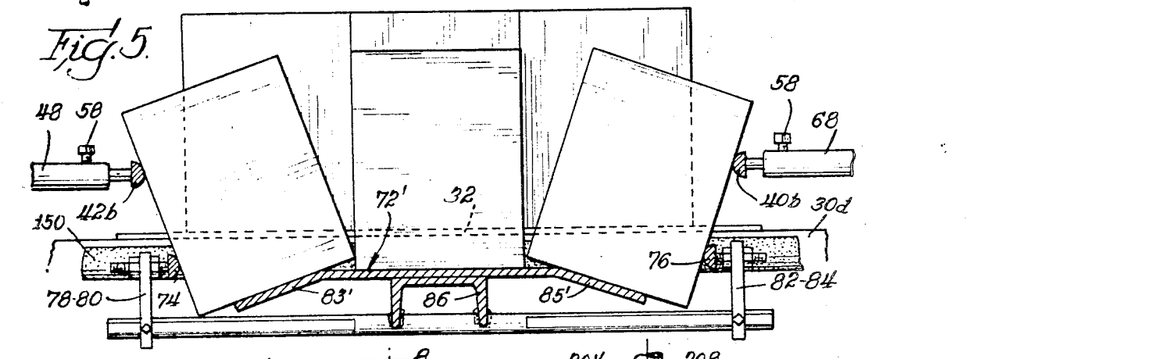
FIGURE 5 is similar to FIGURE 4 and shows the case loader apparatus in adjusted position for handling three side-by-side rows of packages.

FIGURE 5 is a view similar to FIGURE 4 showing an alternative use of the invention where packages are delivered in three side-by-side rows to the infeed plate 32 and then to a loading plate 72'. As previously explained in conjunction with FIGURES 10 and 11, it is preferable when loading eight-packs to deliver the packages to the case loader 20 in three side-by-side rows. It will be seen from FIGURE 5 that when three rows of packages are delivered to the loading plate 72', the center row will remain upright while the two outer rows will be tilted. Several interchangeable loading plates may be provided and it will be seen that the loading plate 72' of FIGURE 5 is greater in width than the loading plate 72 of FIGURE 4. Moreover, the center divider plate 44 of FIGURE 4 is removable, and in the application shown in FIGURE 5 such plate is eliminated to accommodate the center row of packages. The upper guide rails 40 and 42 and the lower guide rails 74 and 76 are laterally adjustable in accordance with the type of packages being loaded.

As previously stated, the entire front stop assembly 88 including the stop members 100, 102 is adjustable forwardly and rearwardly along the tracks 112 so that the trailing end of a package group on the loading plate 72 will be disposed substantially immediately forwardly of the pusher bar 150. In addition, with reference to FIGURE 1, the four threaded support rods 166 may be rotated relative to the angle bars 30*b* and 30*e* to adjust the height of the tray conveyor section 160 in accordance with the height of the trays T. In the foregoing example where the packages are delivered in three rows, the trays will normally be delivered to the tray conveyor 160 so as to be oriented at right angles to the position shown in FIGURES 1–3, i.e., the major axis of each tray will be transverse to the path of movement of the tray conveyor.

It should be understood that the term "article supporting means" as used in the appended claims refers broadly to either or both of the infeed plate 32 and the loading plate 72 or equivalents thereof, and the term "tray supporting means" refers broadly to the tray conveyor section 160 or equivalents thereof. While the loading plate 72 described herein is designed to provide for tilting of the articles to facilitate their entry into a tray, the present invention is in no way limited to the tilting of the articles and may be used in various other applications where the articles remain upright as they are being loaded. With respect to the pusher bar 150, it should further be understood that various other types of apparatus may be utilized for advancing the articles from the loading plate to a tray in loading position, and if desired an endless chain type conveyor having spaced pusher bars thereon may be utilized, in which case it is possible to eliminate the delay resulting from the necessity for returning the pusher bar 150 to its original position after each power stroke.

Thus, while we have described our invention in certain preferred forms, we do not intended to be limited to any such forms, except insofar as the appended claims are so limited, since modifications coming within the scope of our invention will readily occur to those skilled in the art, particularly with our disclosure before them.

We claim:

1. A case loader for loading a plurality of articles into an open top case or tray comprising, in combination, article supporting means for receiving articles from an article conveyor, tray supporting means for receiving trays from a tray conveyor, said tray supporting means being disposed beneath said article supporting means and in converging relation therewith, first releasable article stop means for stopping the leading article on said article supporting means, second releasable article stop means disposed rearwardly of said first stop means for stopping an article disposed a predetermined distance behind said leading article, said first and second releasable stop means being spaced apart a predetermined distance so that the group of articles disposed on said article supporting means forwardly of said second stop means comprises the contents of a single layer tray, pusher means for pushing said group of articles generally forwardly past said first stop means off the forward end of said article supporting means and into a loading tray on said tray supporting means, said article supporting means and said converging tray supporting means being oriented relative to one another so that when said group of articles is pushed forwardly along said article supporting means by said pusher means said group of articles will move in converging relation with a leading tray on said tray supporting means and the leading articles in said group will engage the leading wall of said tray and propel the latter generally forwardly as the group of articles enters said tray, and actuating means for effecting a loading operation by moving said second stop means to an operative position, moving said first stop means to an inoperative position, and operating said pusher means to push said group of articles into said leading tray, said actuating means thereafter returning said first stop means to its operative position and said second stop means to its inoperative position so as to permit a further group of articles to advance past said second stop means to said first stop means.

2. The invention of claim 1 including an article conveyor which conveys a continuous supply of articles to said article supporting means, said article conveyor being continuously operable and being adapted to slip beneath articles thereon when said articles are temporarily stopped.

3. The invention of claim 1 including yieldable stop means for stopping said leading tray in a loading position on said tray supporting means, and a tray conveyor which conveys a continuous supply of trays to said tray supporting means, said tray conveyor being continuously operable and being adapted to slip beneath trays thereon when said trays are temporarily stopped.

4. The invention of claim 1 where said article supporting means is inclined downwardly so that articles will move therealong at least in part due to gravity.

5. The invention of claim 4 including an article conveyor which conveys a continuous supply of articles to said article supporting means, said article conveyor being continuously operable and being adapted to slip beneath articles thereon when said articles are temporarily stopped, a tray conveyor which conveys a continuous supply of trays to said tray supporting means, and yieldable stop means for stopping said leading tray in a loading position on said tray supporting means, said tray conveyor being continuously operable and being adapted to slip beneath trays thereon when said trays are temporarily stopped.

6. A case loader for loading a plurality of articles into an open top case or tray comprising, in combination, article supporting means for receiving articles from an article conveyor, said article supporting means including infeed means and loading means, said infeed means being disposed adjacent the end of said article conveyor for receiving articles therefrom, and said loading means being disposed adjacent the end of said infeed means for receiving articles therefrom, said loading means being offset beneath said infeed means so as to expose the lower portion of the rear end of an article disposed on the rear of said loading means, tray supporting means for receiving trays from a tray conveyor, said tray supporting means being disposed beneath said article supporting means and in converging relation therewith, pusher means for pushing a group of articles generally forwardly off the forward end of said loading means and into a leading tray on said tray supporting means, said pusher means being disposed slightly above said loading means and substantially immediately behind the rear end thereof for cooperation with the exposed lower portion of said article, and actuating means for operating said pusher means to push said group of articles into said leading tray, said loading means and said tray supporting means being oriented relative to one another so that when said group of articles is pushed forwardly along said loading means by said pusher means said group of articles will move in converging relation with a leading tray on said tray supporting means and the leading articles in said group will engage the leading wall of said tray and propel the latter generally forwardly as the group of articles enters said tray.

7. The invention of claim 6 including first releasable article stop means for stopping the leading article on said loading means, second releasable article stop means disposed rearwardly of said first stop means for stopping the leading article on said infeed means, said first and second releasable stop means being spaced apart a predetermined distance so that the group of articles disposed forwardly of said second stop means on said loading means comprises the contents of a single layer tray, and actuating means for effecting a loading operation by moving said second stop means to an operative position, moving said first stop means to an inoperative position, and operating said pusher means to push said group of articles forwardly past said first stop means into said leading tray, said actuating means thereafter returning said first stop means to its operative position and said second stop means to is inoperative position so as to permit a further group of articles to advance past said second stop means to said first stop means.

8. The invention of claim 7 including an article conveyor which conveys a continuous supply of articles to said infeed means, said article conveyor being continuously operable and being adapted to slip beneath articles thereon when said articles are temporarily stopped.

9. The invention of claim 7 including yieldable stop means for stopping said leading tray in a loading position on said tray supporting means, and a tray conveyor which conveys a continuous supply of trays to said tray supporting means, said tray conveyor being continuously operable and being adapted to slip beneath trays thereon when said trays are temporarily stopped.

10. The invention of claim 7 where said infeed means and said loading means are substantially parallel to one another and are inclined downwardly so that articles will move therealong at least in part due to gravity.

11. A case loader for loading a plurality of articles into an open top case or tray comprising, in combination, article conveying means which convey a continuous supply of articles, article supporting means for receiving articles from said article conveying means, said article supporting means including infeed means and loading means, said infeed means being disposed adjacent the end of said article conveying means for receiving articles therefrom, and said loading means being disposed adjacent the end of said infeed means for receiving articles therefrom, said loading means being offset beneath said infeed means so as to expose the lower portion of the rear end of an article disposed on the rear of said loading means, and said infeed means and said loading means being substantially parallel to one another and inclined downwardly so that articles will move therealong at least in part due to gravity, a tray conveyor which conveys a continuous supply of trays, tray supporting means for receiving trays from said tray conveyor, said tray supporting means being disposed beneath said article supporting means and in converging relation therewith, first releasable article stop means for stopping the leading article on said loading means, second releasable article stop means disposed rearwardly of said first stop means for stopping the leading article on said infeed means, said first and second releasable stop means being spaced apart a predetermined distance so that the group of articles disposed forwardly of said second stop means on said loading means comprises the contents of a single layer tray, said article conveying means being continuously operable and being adapted to slip beneath articles thereon when said articles are temporarily stopped, yieldable stop means for stopping the leading tray on said tray supporting means in a loading position, said tray conveyor being continuously operable and being adapted to slip beneath trays thereon when said trays are temporarily stopped, pusher means for pushing said group of articles generally forwardly past said first stop means off the forward end of said loading means and into said leading tray on said tray supporting means, said loading means and said tray supporting means being oriented relative to one another so that when said group of articles is pushed forwardly along said loading means by said pusher means said group of articles will move in converging relation with a leading tray on said tray supporting means and the leading articles in said group will engage the leading wall of said tray and propel the latter generally forwardly as the group of articles enters said tray, and actuating means for effecting a loading operation by moving said second stop means to an operative position, moving said first stop means to an inoperative position, and operating said pusher means to push said group of articles into said leading tray, said actuating means thereafter returning said first stop means to its operative position and said second stop means to its inoperative position so as to permit a further group of articles to be advanced past said second stop means to said first stop means by said article conveying means.

12. The invention of claim 1 where said second article stop means comprises a clamping member which overlies said article supporting means and is movable toward and away from said article supporting means between an upper inoperative position in which it permits articles to freely pass therebeneath and a lower operative position in which it clamps down on the top of an article disposed therebeneath.

13. The invention of claim 1 where said pusher means comprises pusher bar means which is pivotally mounted for arcuate movement about an axis disposed beneath said tray supporting means, said pusher bar means being moved forwardly about said axis to push said group of articles into said leading tray and then being returned to its original position prior to a subsequent loading operation.

14. The invention of claim 1 where said first stop means is adjustable forwardly and rearwardly along the length of said article supporting means in accordance with the size of the packages being loaded, and where said first stop means is located so that the rear end of a group of articles comprising the contents of a single layer tray will be disposed substantially immediately forwardly of said pusher means when the latter is in its normal rearward position.

15. The invention of claim 6 where said infeed means comprise a stationary infeed plate which supports a plurality of articles in a generally upright position and where said loading means comprises a stationary article supporting member which supports a plurality of articles in a tilted position.

16. The invention of claim 1 where said tray supporting means is disposed substantially horizontally and comprises a vertically adjustable assembly of anti-friction rollers which permits trays to be moved thereover by a tray conveyor which delivers a continuous supply of trays to one end thereof.

17. A method of loading a plurality of articles into an open top case or tray comprising the steps of conveying a continuous supply of articles along an article path in at least two side-by-side rows, conveying a continuous supply of trays in a single row in end-to-end relation, said trays being conveyed along a tray path which is beneath said article path and converges therewith, stopping the leading articles in a loading position, stopping the leading tray in a loading position, restraining said two rows of articles at a location rearwardly of said leading articles so that there will be disposed forwardly of the restraint a group of articles including said leading articles which comprises the contents of a single layer tray, releasing said leading articles, pushing said group of articles forwardly along a path which converges with the leading one of said trays so as to move the leading articles in said group into engagement with the leading wall of said tray thereby propelling the latter forwardly as the group of articles enters said tray, discontinuing the restraint of said two rows of articles at the rearward location, advancing the two rows of articles until the next leading articles are disposed at the loading position, and again stopping the leading articles in said loading position.

18. The method of claim 17 including the step of supporting said group of articles at a lower level than the articles therebehind, the articles being dropped to such lower level after passing the rearward location where said two rows of articles are temporarily restrained.

References Cited

UNITED STATES PATENTS

| | | | |
|---|---|---|---|
| 3,332,200 | 7/1967 | Englander | 53—160 X |
| 3,377,774 | 4/1968 | Nigrelli | 53—244 X |
| 2,630,951 | 3/1953 | Slightam | 53—26 |
| 2,834,165 | 5/1958 | Bonebrake. | |
| 2,939,256 | 6/1960 | Nigrelli. | |
| 2,946,164 | 7/1960 | Potts. | |
| 2,961,810 | 11/1960 | Johnson. | |
| 3,069,823 | 12/1962 | Schmid. | |
| 3,082,584 | 3/1963 | Schmid. | |
| 3,218,780 | 11/1965 | Kerr | 53—164 |

WAYNE A. MORSE, JR., Primary Examiner

U.S. Cl. X.R.

53—160, 165, 244, 252